US012693267B2

(12) United States Patent
Min et al.

(10) Patent No.: US 12,693,267 B2
(45) Date of Patent: Jul. 28, 2026

(54) METHOD FOR MEASURING NORMAL INCIDENCE SOUND ABSORPTION COEFFICIENT OF NON-STANDARD SIZED SAMPLES

(71) Applicant: SOUTHEAST UNIVERSITY, Nanjing (CN)

(72) Inventors: Hequn Min, Nanjing (CN); Huading Lou, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 392 days.

(21) Appl. No.: 18/558,738

(22) PCT Filed: Mar. 2, 2023

(86) PCT No.: PCT/CN2023/079216
§ 371 (c)(1),
(2) Date: Nov. 2, 2023

(87) PCT Pub. No.: WO2024/066200
PCT Pub. Date: Apr. 4, 2024

(65) Prior Publication Data
US 2025/0052721 A1    Feb. 13, 2025

(30) Foreign Application Priority Data
Sep. 30, 2022    (CN) ......................... 202211215428.9

(51) Int. Cl.
*G01N 29/04*    (2006.01)
(52) U.S. Cl.
CPC ..... *G01N 29/041* (2013.01); *G01N 2291/018* (2013.01); *G01N 2291/023* (2013.01)

(58) Field of Classification Search
CPC ........... G01N 29/041; G01N 2291/018; G01N 2291/023; G01N 29/09
See application file for complete search history.

(56) References Cited

FOREIGN PATENT DOCUMENTS

| | | |
|---|---|---|
| CN | 110231408 A | 9/2019 |
| CN | 115508451 A | 12/2022 |
| JP | 2012202802 A | 10/2012 |

OTHER PUBLICATIONS

Chidhurappa Vamshi et al., "Research on the Effect of Imprecise Size Foam Samples on Acoustic Measurements in Impedance Tube", International Journal of Recent Technology and Engineering (IJRTE), ISSN: 2277-3878, vol. 8, Issue-2S11, Sep. 2019, pp. 3045-3049.*

(Continued)

*Primary Examiner* — Alexander Satanovsky
(74) *Attorney, Agent, or Firm* — Bayramoglu Law Offices LLC

(57) ABSTRACT
A method for measuring the normal incidence sound absorption coefficient of anon-standard sized sample is provided. First, a PAM having a specific acoustic impedance and a same thickness is arranged next to the non-standard sized sample to form a flat-surface IAIS having a same cross section as an impedance tube; a relational expression between a surface acoustic impedance of IAIS and the non-standard sized sample and PAM is obtained based on an electro-acoustic analogy method; then surface acoustic impedances of IAIS and PAM are measured in the impedance tube, respectively; and a surface acoustic impedance of the non-standard sized sample is derived from the surface acoustic impedance formula of IAIS, and the normal incidence sound absorption coefficient of the non-standard sized sample is finally obtained.

14 Claims, 5 Drawing Sheets

Non-standard sized sample

Select PAM, and make flat-surface IAIS having a same cross section as an impedance tube Relational expression between a surface acoustic impedance of IAIS and the non-standard sized sample and PAM Measure the surface acoustic impedance of IAIS Measure the surface acoustic impedance of PAM Derive real and imaginary parts of a surface acoustic impedance of the non-standard sized sample according to the surface acoustic impedance formula of IAIS, and finally obtain the normal incident acoustic absorption coefficient of the non-standard sized sample

(56) References Cited

OTHER PUBLICATIONS

Daniel L. Palumbo et al., "Improvements to the Two-Thickness Method for Deriving Acoustic Properties of Materials", Noise-Con 2004, Jul. 12-14, 2004, 9 pages.*

Naoki Kino et al., "Investigation of sample size effects in impedance tube measurements", Applied Acoustics 68 (2007), pp. 1485-1493.*

Daniel A. Russell, "Absorption Coefficients and Impedance", Science and Mathematics Department, Kettering University, Flint, MI, 48504, 2013, 6 p., https://www.acs.psu.edu/drussell/Demos/SWR/AbsorptionCoeff.pdf.*

Huading Lou, et al., Measurements of the normal incidence sound absorption coefficient for Non-standard sized absorbers in impedance tubes, Measurement, 2022, pp. 1-10, vol. 203, 111989.

Bin Lei, et al., Measurement of sound absorption coefficients of small-diameter specimens with large-diameter standing wave tubes, Technical Acoustics, 1992, pp. 39-41.

Tao Feng, et al., Calculation of the Equivalent Impedance of the Parallel acoustic Material at the Duct End, Technical Acoustics, 2010, pp. 272-273, vol. 29, No. 6, Pt.2.

GB/T 18696.2-2002, Acoustics—Determination of sound absorption coefficient and impedance in impedance tubes Part 2: Transfer function method, National Standard of The People's Republic of China, 2002, pp. 1-18, General Administration of Quality Supervision, Inspection and Quarantine of the People's Republic of China.

* cited by examiner

Non-standard sized sample

Select PAM, and make flat-surface IAIS having a same cross section as an impedance tube

Relational expression between a surface acoustic impedance of IAIS and the non-standard sized sample and PAM

Measure the surface acoustic impedance of IAIS

Measure the surface acoustic impedance of PAM

Derive real and imaginary parts of a surface acoustic impedance of the non-standard sized sample according to the surface acoustic impedance formula of IAIS, and finally obtain the normal incident acoustic absorption coefficient of the non-standard sized sample

FIG. 1

Impedance tube wall

Standard sized sample

A

Impedance tube wall

Non-standard sized sample

Acoustic diffusion
boundary

PAM with specific
acoustic impedance

IAIS

Non-standard sized
sample

Plane wave

Impedance tube end

PAM

METHOD FOR MEASURING NORMAL INCIDENCE SOUND ABSORPTION COEFFICIENT OF NON-STANDARD SIZED SAMPLES

CROSS REFERENCE TO THE RELATED APPLICATIONS

This application is the national phase entry of International Application No. PCT/CN2023/079216, filed on Mar. 2, 2023, which is based upon and claims priority to Chinese Patent Application No. 202211215428.9, filed on Sep. 30, 2022, the entire contents of which are incorporated herein by reference.

TECHNICAL FIELD

The present invention belongs to the field of acoustic measurement technologies, and specifically relates to a method for measuring the normal incidence sound absorption coefficient of a non-standard sized sample.

BACKGROUND

Sound absorption coefficient is used for representing acoustic absorption performance of a material, with a value range of 0-1. The larger the acoustic absorption coefficient is, the better the acoustic absorption performance of the material is. When the value is 0, it indicates that acoustic energy is totally reflected and the material does not absorb sound. When the value is 1, it indicates that the material absorbs all acoustic energy without reflection. When an incident direction of acoustic wave is perpendicular to a surface of the material, the acoustic absorption coefficient is referred to as a normal incidence sound absorption coefficient. An impedance tube method is commonly used to measure the normal incidence sound absorption coefficient of a material. A test sample is mounted at one end of a straight, rigid, and airtight impedance tube. Plane acoustic wave in the tube is generated by an acoustic source (random noise, pseudo random sequential noise, or linear frequency modulated pulses). Acoustic pressure is measured at two positions near the sample, an acoustic transfer function of two microphone signals is solved, and a normal incident complex reflection factor, an acoustic impedance rate, and a normal incidence sound absorption coefficient of the sample are calculated accordingly.

In the foregoing method, the size of the sample is required to be the same as a cross section of the impedance tube. However, in practical engineering, normal incidence sound absorption coefficients of special samples with sizes significantly smaller than cross sections of impedance tubes may be measured. Moreover, the sizes of some artificially designed acoustic metamaterials may also be significantly smaller than cross sections of impedance tubes. For the non-standard sized samples, the results measured based on the standard GB/T 18696.2-2002 are obviously not the acoustic absorption coefficients of materials.

SUMMARY

To solve the shortcomings mentioned in the background, the present invention aims to provide a method for measuring the normal incidence sound absorption coefficient of a non-standard sized sample.

The objective of the present invention may be achieved through the following technical solution: A method for measuring the normal incidence sound absorption coefficient of a non-standard sized sample includes the following steps:

arranging, next to the non-standard sized sample, a parallel-arranged acoustic material (PAM) having a specific acoustic impedance and a same thickness to form a flat-surface inhomogeneous acoustic impedance sample (IAIS) having a same cross section as an impedance tube;

obtaining a relational expression between a surface acoustic impedance of the IAIS and the non-standard sized sample and the PAM by using the parallel relationship between the non-standard sized samples and the PAM;

measuring the surface acoustic impedance of the IAIS and a surface acoustic impedance of the PAM; and deriving a surface acoustic impedance of the non-standard sized sample according to the relational expression between the surface acoustic impedance of the IAIS and the non-standard sized sample and the PAM and by using the measured surface acoustic impedances of the IAIS and the PAM, and finally obtaining the normal incidence sound absorption coefficient of the non-standard sized sample by using real and imaginary parts of the surface acoustic impedance.

Preferably, the cross-sectional size of the non-standard sized sample is smaller than that of the impedance tube.

Preferably, the cross-sectional size of the impedance tube is $A \times A$.

Preferably, the non-standard sized sample is arranged at an end of the impedance tube, and a gap between the two is filled with the PAM having an equal thickness, to form the IAIS having a uniform thickness and a flat surface without a back cavity from the end of the impedance tube; and plane wave is incident from a left side of the impedance tube.

Preferably, if only one PAM is arranged next to the non-standard sized sample, a formula of the surface acoustic impedance $Z_{IAIS}$ of the IAIS is:

$$\frac{1}{Z_{IAIS}} = \frac{r_{NSS}}{Z_{NSS}} + \frac{r_{PAM}}{Z_{PAM}} \tag{1}$$

Where $r_{NSS}=A_{NSS}/A_{IAIS}$ and $r_{PAM}=A_{PAM}/A_{IAIS}$ are a ratio of an area of the non-standard sized sample (NSS) to a cross-sectional area of the impedance tube and a ratio of an area of the PAM to the cross-sectional area of the impedance tube, respectively; $A_{NSS}$ and $A_{PAM}$ are cross-sectional areas of the NSS and the PAM, respectively; $A_{IAIS}$ is a cross-sectional area of the IAIS (namely, the cross-sectional area of the impedance tube); and $Z_{NSS}$ and $Z_{PAM}$ are the surface acoustic impedance of the NSS and the surface acoustic impedance of the PAM, respectively.

Preferably, if a plurality of PAMs are arranged next to the non-standard sized sample, a formula of the surface acoustic impedance $Z_{IAIS}$ of the IAIS is:

$$\frac{1}{Z_{IAIS}} = \frac{r_{NSS}}{Z_{NSS}} + \sum_{i=1}^{n} \frac{r_{PAM,i}}{Z_{PAM,i}} \tag{2}$$

Where $r_{PAM, i}$ and $Z_{PAM,i}$ are an area ratio and a surface acoustic impedance of the $i^{th}$ PAM, respectively.

Preferably, the process of measuring the surface acoustic impedance of the IAIS and a surface acoustic impedance of the PAM includes the following steps:

the plane wave is incident from the left side, propagated in an x-axis direction to a surface of the IAIS or PAM without a back cavity, and reflected; microphones 1 and 2 are used for measuring complex acoustic pressure of a standing wave field inside the tube, the distance between microphones 1 and 2 is s, and the distances between the microphones and the surface of the sample are $x_1$ and $x_2$, respectively; a cross spectrum $S_{12}$ and a self-spectrum $S_{11}$ between the two measuring microphones are expressed as $$S_{12} = sp_1 \cdot sp_2^* \qquad (3)$$

$$S_{11} = sp_1 \cdot sp_1^* \qquad (4)$$

Where * represents a conjugate complex number, and $sp_1$ and $sp_2$ represent complex acoustic pressure at microphone 1 and microphone 2, respectively; a transfer function $H_{12}$ from microphone 1 to microphone 2 is expressed as $$H_{12} = S_{12}/S_{11} \qquad (5)$$

A transfer function $H_i$ of incident wave can be expressed as $$H_i = \frac{p_{2i}}{p_{1i}} = e^{-jk_0(x_1 - x_2)} = e^{-jk_0 s} \qquad (6)$$

Where $k_0 = 2\pi f/c$, which is a wave number; c is an acoustic velocity; f is a frequency; and j is an imaginary unit;

Similarly, a transfer function $H_r$ of reflected wave can be expressed as $$H_r = \frac{p_{2r}}{p_{1r}} = e^{jk_0(x_1 - x_2)} = e^{jk_0 s} \qquad (7)$$

A complex reflection factor r on the surface of the IAIS or PAM is expressed as $$r = \frac{H_{12} - H_i}{H_r - H_{12}} e^{2jk_0 x_1} \qquad (8)$$

Therefore, the surface acoustic impedance Z of the IAIS or PAM is expressed as $$Z = \frac{1 + r}{1 - r}. \qquad (9)$$

Preferably, after the surface acoustic impedances of the IAIS and the PAM are obtained, the surface acoustic impedance $Z_{NSS}$ of the non-standard sized sample is calculated by formula (2), $$Z_{NSS} = \frac{r_{NSS}}{\frac{1}{Z_{IAIS}} - \sum_{i=1}^{n} \frac{r_{PAM,i}}{Z_{PAM,i}}} \qquad (10)$$

Then, the normal incidence sound absorption coefficient $\alpha_{NSS}$ of the non-standard sized sample is expressed as $$\alpha_{NSS} = \frac{4\text{Re}(Z_{NSS})}{[1 + \text{Re}(Z_{NSS})]^2 + [Imag(Z_{NSS})]^2} \qquad (11)$$

Where $\text{Re}(Z_{NSS})$ is the real part of the acoustic impedance of the non-standard sized sample; and $\text{Imag}(Z_{NSS})$ is the imaginary part of the acoustic impedance of the non-standard sized sample.

Preferably, a device includes:

one or more processors; and a memory configured to store one or more programs.

When the one or more programs are executed by the one or more processors, the one or more processors are enabled to implement the method for measuring the normal incidence sound absorption coefficient of a non-standard sized sample according to any one of claims 1-8.

Preferably, a storage medium including computer executable instructions, where the computer executable instructions, when executed by a computer processor, are used for performing the method for measuring the normal incidence sound absorption coefficient of a non-standard sized sample according to any one of claims 1-8.

Beneficial effects of the present invention are as follows:

Normal incidence sound absorption coefficients of non-standard sized samples with any cross-sectional size and shape can be measured with high accuracy, and the accuracy of the measuring method can be further improved by selecting appropriate PAMs.

BRIEF DESCRIPTION OF THE DRAWINGS

In order to describe the technical solutions in the embodiments of the present invention or in the prior art more clearly, the following briefly introduces the accompanying drawings required in the description of the embodiments or the prior art. Apparently, a person of ordinary skill in the art may still derive other drawings from these drawings without any creative effort.

FIG. 1 is a flowchart of a method for measuring the normal incidence sound absorption coefficient of a non-standard sized sample according to the present invention;

DETAILED DESCRIPTION OF THE EMBODIMENTS

The technical solutions in the embodiments of the present invention will be clearly and completely described below with reference to the accompanying drawings in the embodiments of the present invention. Apparently, the described embodiments are only some of the embodiments of the present invention, not all of them. All other embodiments obtained by those of ordinary skill in the art based on the embodiments of the present invention without any creative effort fall within the scope of protection of the present invention.

Figure 2:
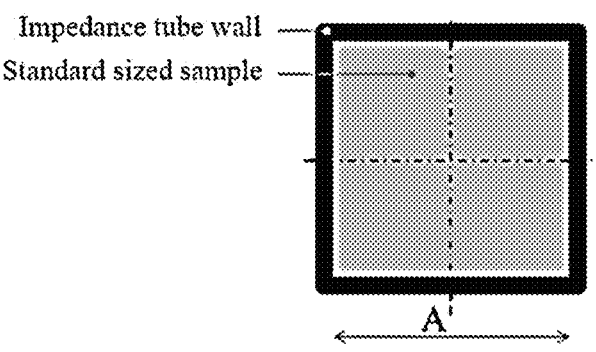
FIG. 2 is a schematic diagram of a standard sized sample inside an impedance tube according to the present invention.
Figure 3:
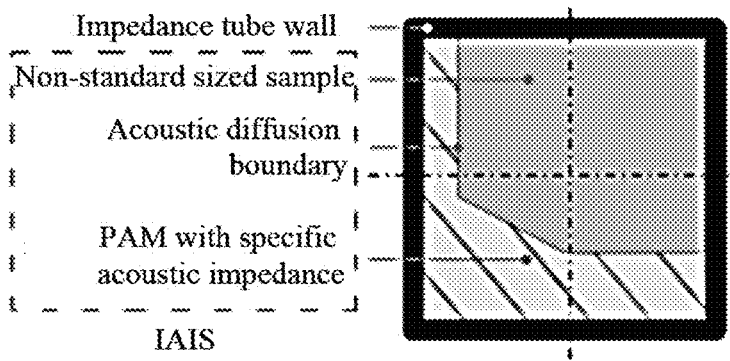
FIG. 3 is a schematic diagram of a non-standard sized sample inside an impedance tube according to the present invention.

As shown in FIG. 1, step 1: As shown in FIG. 2, the cross-sectional size of a standard sized sample is the same as that of an impedance tube, both of which are A×A. The normal incidence sound absorption coefficient of the standard sized sample can be directly measured according to GB/T 18696.2-2002. For a non-standard sized sample, as shown in FIG. 3, its cross-sectional size is significantly smaller than that of the impedance tube, so its normal incidence sound absorption coefficient cannot be directly measured. Therefore, a PAM having a specific acoustic impedance and a same thickness is arranged next to the non-standard sized sample to form a flat-surface IAIS having a same cross section as the impedance tube.

Figure 4:
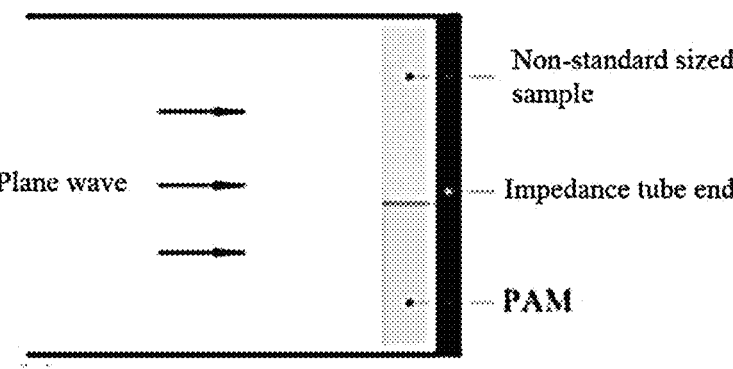
FIG. 4 shows an acoustic model of IAIS inside an impedance tube according to the present invention.
Figure 5:
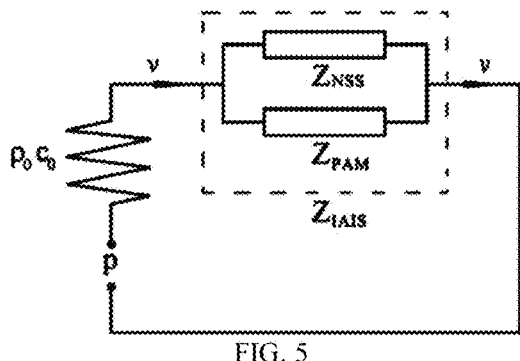
FIG. 5 is an equivalent circuit diagram of the IAIS acoustic model according to the present invention.

Step 2: FIG. 4 shows an acoustic model of IAIS. The non-standard sized sample is arranged at an end of the impedance tube, and a gap between the two is filled with the PAM having an equal thickness, to form the IAIS having a uniform thickness and a flat surface without a back cavity from the end of the impedance tube. Plane wave is incident from a left side of the impedance tube. According to the parallel relationship between the non-standard sized sample and the PAM, an equivalent circuit diagram of the IAIS is shown in FIG. 5, where $\rho_0 c_0$ is characteristic acoustic impedance of air. A surface acoustic impedance of the IAIS can be expressed as $$\frac{1}{Z_{IAIS}} = \frac{r_{NSS}}{Z_{NSS}} + \frac{r_{PAM,i}}{Z_{PAM,i}} \quad (1)$$

Where $r_{NSS} = A_{NSS}/A_{IAIS}$ and $r_{PAM} = A_{PAM}/A_{IAIS}$ are ratios of areas of the NSS and the PAM to the cross-sectional area of the impedance tube, respectively; $Z_{NSS}$ and $Z_{PAM}$ are surface acoustic impedances of the NSS and the PAM, respectively. If a plurality of PAMs are arranged next to the NSS, the surface acoustic impedance of the IAIS can be expressed as $$\frac{1}{Z_{IAIS}} = \frac{r_{NSS}}{Z_{NSS}} + \sum_{i=1}^{n} \frac{r_{PAM,i}}{Z_{PAM,i}} \quad (2)$$

Where $r_{PAM,\ i}$ and $Z_{PAM,i}$ are an area ratio and a surface acoustic impedance of the $i^{th}$ PAM, respectively.

Figure 6:
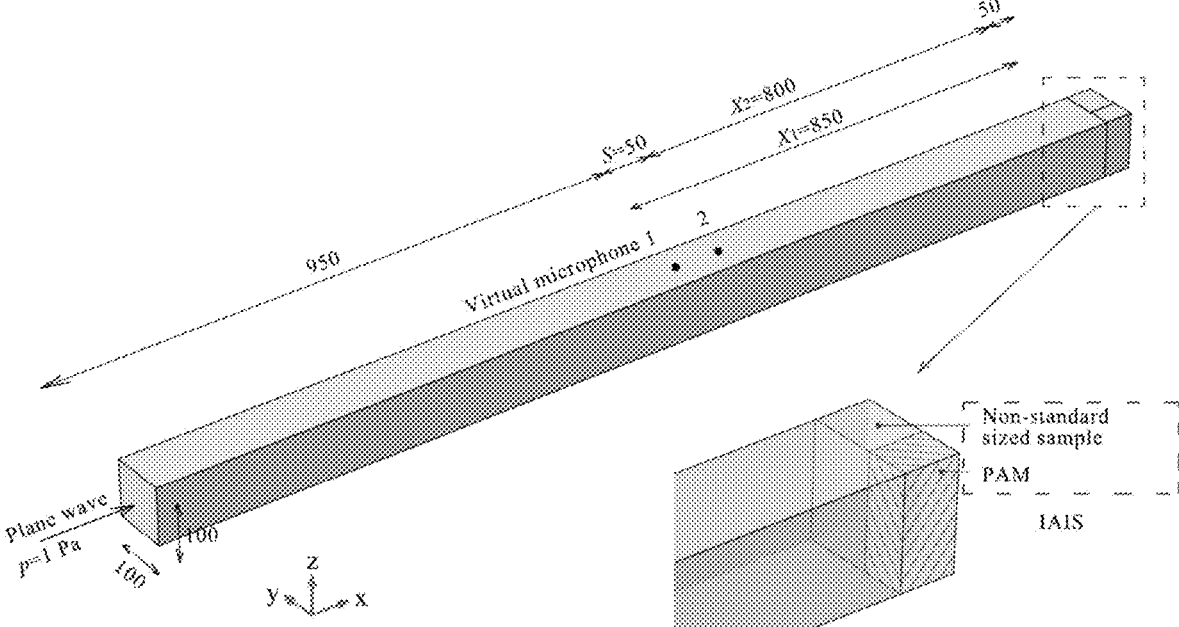
FIG. 6 is a diagram of an impedance tube model for measuring a surface acoustic impedance of IAIS or PAM according to the present invention.

Step 3: Based on the standard GB/T 18696.2-2002, the surface acoustic impedances of the IAIS and the PAM are measured, as shown in FIG. 6. The plane wave is incident from the left side, propagated in an x-axis direction to a surface of the sample (namely, IAIS or PAM) without a back cavity, and reflected. Microphones 1 and 2 are used for measuring complex acoustic pressure of a standing wave field inside the tube, the distance between the microphones is s, and the distances between the microphones and the surface of the sample are $x_1$ and $x_2$, respectively. A cross spectrum $S_{12}$ and a self-spectrum $S_{11}$ between the two measuring microphones are expressed as $$S_{12} = sp_1 \cdot sp_2^* \quad (3)$$

$$S_{11} = sp_1 \cdot sp_1^* \quad (4)$$

Where * represents a conjugate complex number, and $sp_1$ and $sp_2$ represent complex acoustic pressure at microphone 1 and microphone 2, respectively. A transfer function $H_{12}$ from microphone 1 to microphone 2 can be expressed as $$H_{12} = S_{12}/S_{11} \quad (5)$$

A transfer function $H_i$ of incident wave can be expressed as $$H_i = \frac{p_{2_i}}{p_{1_i}} = e^{-jk_0(x_1 - x_2)} = e^{-jk_0 s} \quad (6)$$

Where $k_0 = 2\pi f/c$, which is a wave number; c is an acoustic velocity; f is a frequency; and j is an imaginary unit.

Similarly, a transfer function $H_r$ of reflected wave can be expressed as $$H_r = \frac{p_{2_r}}{p_{1_r}} = e^{jk_0(x_1 - x_2)} = e^{jk_0 s} \quad (7)$$

A complex reflection factor r on the surface of the IAIB (or PAM) can be expressed as $$r = \frac{H_{12} - H_i}{H_r - H_{12}} e^{2jk_0 x_1} \quad (8)$$

Therefore, the surface acoustic impedance of the IAIB (or PAM) can be expressed as $$Z = \frac{1 + r}{1 - r} \quad (9)$$

Step 4: After the surface acoustic impedances of the IAIS and the PAM are obtained, the surface acoustic impedance $Z_{NSS}$ of the non-standard sized sample can be calculated by formula (2), namely, $$Z_{NSS} = \frac{r_{NSS}}{\frac{1}{Z_{IAIS}} - \sum_{i=1}^{n} \frac{r_{PAM,i}}{Z_{PAM,i}}} \quad (10)$$

Then, the normal incidence sound absorption coefficient $\alpha_{NSS}$ of the non-standard sized sample can be expressed as $$\alpha_{NSS} = \frac{4Re(Z_{NSS})}{[1 + Re(Z_{NSS})]^2 + [Imag(Z_{NSS})]^2} \quad (11)$$

Figure 7:
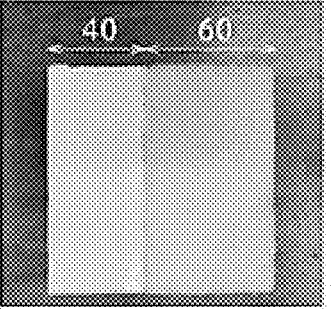
FIG. 7 is a diagram of an IAIS porous acoustic absorption sample b measured in an experiment according to the present invention.
Figure 8:
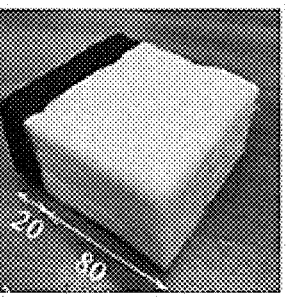
FIG. 8 is a diagram of an IAIS porous acoustic absorption sample d measured in an experiment according to the present invention.
Figure 9:
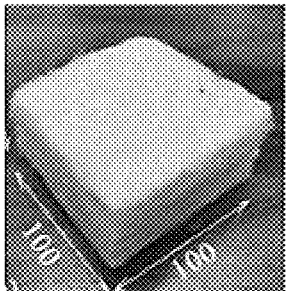
FIG. 9 is a diagram of a standard sized porous acoustic absorption sample e measured in an experiment according to the present invention.
Figure 10:
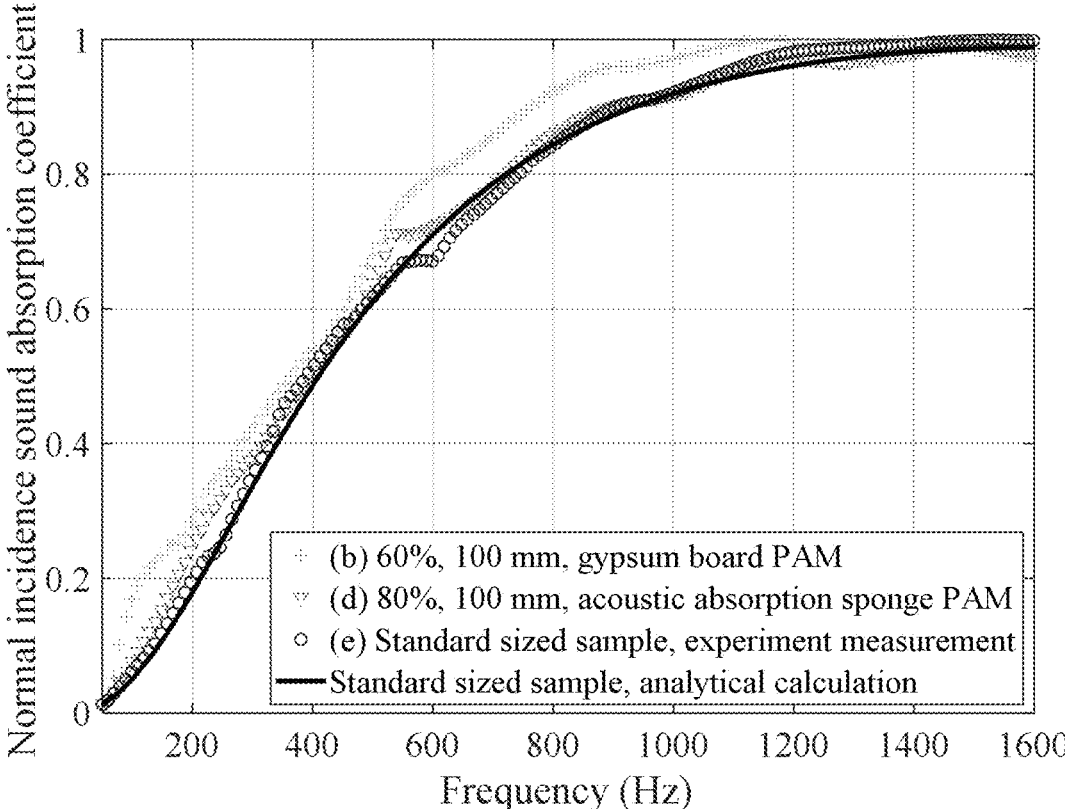
FIG. 10 is a diagram showing normal incidence sound absorption coefficients of non-standard sized porous acoustic absorption samples under different conditions according to the present invention.
Figure 11:
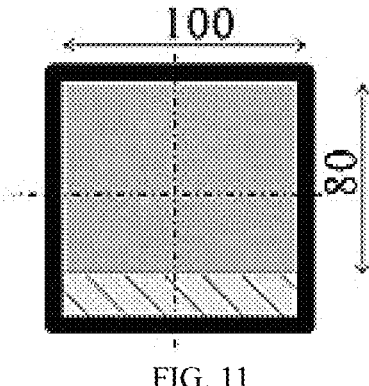
FIG. 11 is a diagram of an IAIS resonant acoustic absorption structured sample according to the present invention.
Figure 12:
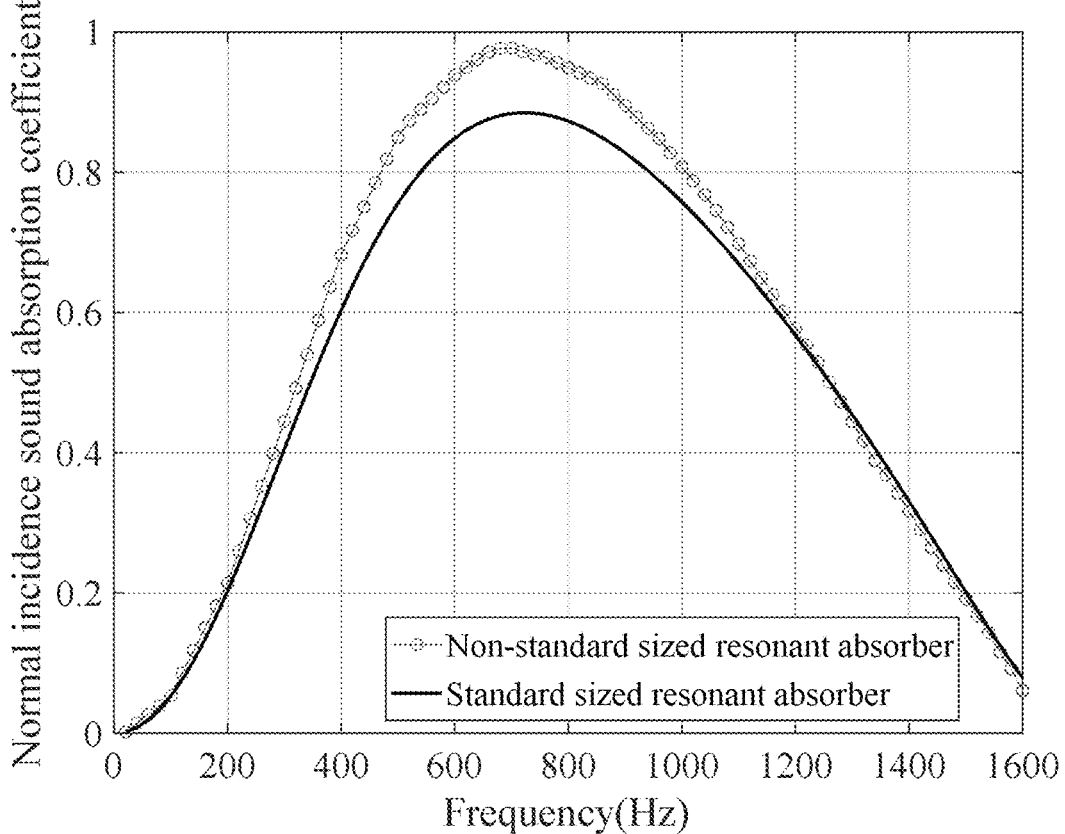
FIG. 12 is a schematic diagram showing the normal incidence sound absorption coefficient of a non-standard sized resonant acoustic absorption structure according to the present invention.

Step 5: Normal incidence sound absorption coefficients of a non-standard sized porous acoustic absorption material and a resonant acoustic absorption structured sample are measured according to the above measuring method. Test pieces include a standard sized porous acoustic absorption sample (as shown in FIG. 9), two IAIS porous material samples with different parameters (as shown in FIG. 7 and FIG. 8), and an IAIS resonant acoustic absorption structured sample (as shown in FIG. 11). Their cross-sectional sizes are all 100 mm×100 mm. In the IAIS porous material samples, the material of the non-standard sized sample is extra-fine glass wool, and the material of PAM is acoustic absorption sponge or a gypsum board. In the IAIS resonant acoustic absorption structured sample, the non-standard sized sample is a micro-perforated board, and the material of PAM is a gypsum board. The materials and parameters of the standard sized samples are the same as those of the non-standard sized samples. The normal incidence sound absorption coefficients of the non-standard sized samples obtained from experiments are shown in FIG. 10 and FIG. 12. From the measurement results, the measured values of sample d and the standard sized sample have the best fit, with an error rate of only 1.0%; the fit between sample b and the standard sized sample is slightly lower, with an error rate of 6.6%; and an error rate of the non-standard sized resonant acoustic absorption sample is 7.1%. The experiments verify that the measuring method has high accuracy, and the accuracy can be further improved by selecting PAM with an acoustic absorption coefficient closer to that of the non-standard sized sample.

Based on the same inventive concept, the present invention further provides a computer device. The computer device includes: one or more processors, and a memory configured to store one or more computer programs; the programs include program instructions; and the processor is configured to execute the program instructions stored in the memory. The processor may be a central processing unit (CPU), or other general-purpose processors, digital signal processors (DSPs), application specific integrated circuits (ASICs), field-programmable gate arrays (FPGAs), or other programmable logic devices, discrete gates or transistor logic devices, discrete hardware components, or the like. The processor is a computing core and control core of a terminal, configured to implement one or more instructions, and specifically configured to load and execute one or more instructions in a computer storage medium to implement the foregoing method.

It should be further explained that, based on the same inventive concept, the present invention further provides a computer storage medium, where the storage medium stores a computer program, and when the computer program is run by a processor, the foregoing method is performed. The storage medium may be one of or any combination of computer-readable media. The computer-readable medium may be a computer-readable signal medium or a computer-readable storage medium. For example, the computer-readable storage medium may be, but is not limited to, an electrical, magnetic, optical, electromagnetic, infrared, or semiconductor system, apparatus, or device, or any combination of the above. More specific examples (a non-exhaustive list) of the computer-readable storage medium include: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory, a magnetic memory, or any suitable combination of the above. In the present invention, the computer-readable storage medium may be any tangible medium containing or storing programs that may be used by an instruction execution system, apparatus, or device, or a combination thereof.

In this specification, the description with reference to the term such as "an embodiment", "example", "specific example", or the like means that a specific feature, structure, material, or characteristic described with reference to the embodiment or example is included in at least one embodiment or example of the present disclosure. In this specification, the schematic expression for the term does not necessarily refer to the same embodiment or example. Moreover, the described specific feature, structure, material, or characteristic may be combined in any one or more embodiments or examples in a suitable manner.

The basic principles, main features, and advantages of the present disclosure are shown and described above. Those skilled in the art should understand that the present disclosure is not limited by the foregoing embodiments, the foregoing embodiments and the descriptions in the specification only illustrate the principles of the present disclosure, the present disclosure have various changes and improvements without departing from the spirit and scope of the present disclosure, and these changes and improvements all fall within the scope of protection of the present disclosure.

What is claimed is:

1. A method for measuring a normal incidence sound absorption coefficient of a non-standard sized sample, comprising the following steps:

arranging, next to the non-standard sized sample, a parallel-arranged acoustic material (PAM) having a specific acoustic impedance and a same thickness to form a flat-surface inhomogeneous acoustic impedance sample (IAIS) having a same cross section as an impedance tube;

obtaining a relational expression between a surface acoustic impedance of the IAIS and the non-standard sized sample and the PAM by using a parallel relationship between the non-standard sized samples and the PAM;

measuring the surface acoustic impedance of the IAIS and a surface acoustic impedance of the PAM;

deriving a surface acoustic impedance of the non-standard sized sample according to the relational expression between the surface acoustic impedance of the IAIS and the non-standard sized sample and the PAM and by using the measured surface acoustic impedances of the IAIS and the PAM, and obtaining the normal incidence sound absorption coefficient of the non-standard sized sample by using real and imaginary parts of the surface acoustic impedance;

wherein a cross-sectional size of the non-standard sized sample is smaller than a cross-sectional size of the impedance tube; and wherein the non-standard sized sample is arranged at an end of the impedance tube, and a gap between the non-standard sized sample and an inner wall of the impedance tube is filled with the PAM having the same thickness, to form the IAIS having a uniform thickness and a flat surface without a back cavity from the end of the impedance tube; and a plane wave is incident from a left side of the impedance tube.

2. The method for measuring the normal incidence sound absorption coefficient of the non-standard sized sample according to claim 1, wherein normal incidence sound absorption coefficients of porous materials of non-standard sized samples and resonant acoustic absorption structures with any cross-sectional size and shape is allowed to be measured.

3. The method for measuring the normal incidence sound absorption coefficient of the non-standard sized sample according to claim 1, wherein if only one PAM is arranged next to the non-standard sized sample, a formula of the surface acoustic impedance $Z_{IAIS}$ of the IAIS is:

$$\frac{1}{Z_{IAIS}} = \frac{r_{NSS}}{Z_{NSS}} + \frac{r_{PAM,i}}{Z_{PAM,i}} \tag{1}$$

wherein $r_{NSS}=A_{NSS}/A_{IAIS}$ and $r_{PAM}=A_{PAM}/A_{IAIS}$ are a ratio of an area of the non-standard sized sample (NSS) to a cross-sectional area of the impedance tube and a ratio of an area of the PAM to the cross-sectional area of the impedance tube, respectively; $A_{NSS}$ and $A_{PAM}$ are a cross-sectional area of the NSS and a cross-sectional area of the PAM, respectively; $A_{IAIS}$ is a cross-sectional area of the IAIS; and $Z_{NSS}$ and $Z_{PAM}$ are the surface acoustic impedance of the NSS and the surface acoustic impedance of the PAM, respectively.

4. The method for measuring the normal incidence sound absorption coefficient of the non-standard sized sample according to claim 3, wherein if a plurality of PAMs are arranged next to the non-standard sized sample, a formula of the surface acoustic impedance $Z_{IAIS}$ of the IAIS is:

$$\frac{1}{Z_{IAIS}} = \frac{r_{NSS}}{Z_{NSS}} + \sum_{i=1}^{n} \frac{r_{PAM,i}}{Z_{PAM,i}} \tag{2}$$

wherein $r_{PAM,\ i}$ and $Z_{PAM,i}$ are an area ratio and a surface acoustic impedance of a $i^{th}$ PAM of the plurality of PAMs, respectively.

5. The method for measuring the normal incidence sound absorption coefficient of the non-standard sized sample according to claim 1, wherein the process of measuring the surface acoustic impedance of the IAIS and the surface acoustic impedance of the PAM comprises the following steps:

a plane wave is incident from a left side, propagated in an x-axis direction to a surface of the IAIS or PAM without a back cavity, and reflected; microphones 1 and 2 are configured for measuring a complex acoustic pressure of a standing wave field inside the impedance tube, a distance between microphones 1 and 2 is s, and distances between the microphones and the surface of the non-standard sized sample are $x_1$ and $x_2$, respectively; a cross spectrum $S_{12}$ and a self-spectrum $S_{11}$ between the microphones 1 and 2 are expressed as $$S_{12} = sp_1 \cdot sp_2^* \tag{3}$$

$$S_{11} = sp_1 \cdot sp_1^* \tag{4}$$

wherein * represents a conjugate complex number, and $sp_1$ and $sp_2$ represent complex acoustic pressure at the microphone 1 and the microphone 2, respectively; a transfer function $H_{12}$ from microphone 1 to microphone 2 is expressed as $$H_{12} = S_{12}/S_{11} \tag{5}$$

a transfer function $H_i$ of incident wave is allowed to be expressed as $$H_i = \frac{p_{2i}}{p_{1i}} = e^{-jk_0(x_1-x_2)} = e^{-jk_0 s} \tag{6}$$

wherein $k_0=2\pi f/c$ being a wave number; c is an acoustic velocity; f is a frequency; and j is an imaginary unit; similarly, a transfer function $H_r$ of reflected wave is allowed to be expressed as $$H_r = \frac{p_{2r}}{p_{1r}} = e^{jk_0(x_1-x_2)} = e^{jk_0 s} \tag{7}$$

a complex reflection factor r on the surface of the IAIS or PAM is expressed as $$r = \frac{H_{12} - H_i}{H_r - H_{12}} e^{2jk_0 x_1} \tag{8}$$

wherein the surface acoustic impedance Z of the IAIS or PAM is expressed as $$Z = \frac{1+r}{1-r}. \tag{9}$$

6. The method for measuring the normal incidence sound absorption coefficient of the non-standard sized sample according to claim 5, wherein after the surface acoustic impedances of the IAIS and the PAM are obtained, the surface acoustic impedance $Z_{NSS}$ of the non-standard sized sample is calculated by formula (2), $$Z_{NSS} = \frac{r_{NSS}}{\frac{1}{Z_{IAIS}} - \sum_{i=1}^{n} \frac{r_{PAM,i}}{Z_{PAM,i}}} \tag{10}$$

the normal incidence sound absorption coefficient $\alpha_{NSS}$ of the non-standard sized sample is expressed as $$\alpha_{NSS} = \frac{4Re(Z_{NSS})}{[1 + Re(Z_{NSS})]^2 + [Imag(Z_{NSS})]^2} \tag{11}$$

11 wherein Re($Z_{NSS}$) is a real part of the acoustic impedance of the non-standard sized sample; and Imag($Z_{NSS}$) is an imaginary part of the acoustic impedance of the non-standard sized sample.

7. A device, comprising:

at least one processor; and a memory configured to store at least one program, wherein when the at least one program is executed by the at least one processor, the at least one processor is enabled to implement the method according to claim 1.

8. The device according to claim 7, wherein in the method, normal incidence sound absorption coefficients of porous materials of non-standard sized samples and resonant acoustic absorption structures with any cross-sectional size and shape is allowed to be measured.

9. The device according to claim 7, wherein in the method, if only one PAM is arranged next to the non-standard sized sample, a formula of the surface acoustic impedance $Z_{IAIS}$ of the IAIS is:

$$\frac{1}{Z_{IAIS}} = \frac{r_{NSS}}{Z_{NSS}} + \frac{r_{PAM}}{Z_{PAM}} \tag{1}$$

wherein $r_{NSS}=A_{NSS}/A_{IAIS}$ and $r_{PAM}=A_{PAM}/A_{IAIS}$ are a ratio of an area of the non-standard sized sample (NSS) to a cross-sectional area of the impedance tube and a ratio of an area of the PAM to the cross-sectional area of the impedance tube, respectively; $A_{NSS}$ and $A_{PAM}$ are a cross-sectional area of the NSS and a cross-sectional area of the PAM, respectively; $A_{IAIS}$ is a cross-sectional area of the IAIS; and $Z_{NSS}$ and $Z_{PAM}$ are the surface acoustic impedance of the NSS and the surface acoustic impedance of the PAM, respectively.

10. The device according to claim 9, wherein in the method, if a plurality of PAMs are arranged next to the non-standard sized sample, a formula of the surface acoustic impedance $Z_{IAIS}$ of the IAIS is:

$$\frac{1}{Z_{IAIS}} = \frac{r_{NSS}}{Z_{NSS}} + \sum_{i=1}^{n} \frac{r_{PAM,i}}{Z_{PAM,i}} \tag{2}$$

wherein $r_{PAM,\,i}$ and $Z_{PAM,i}$ are an area ratio and a surface acoustic impedance of a $i^{th}$ PAM of the plurality of PAMs, respectively.

11. The device according to claim 7, wherein in the method, the process of measuring the surface acoustic impedance of the IAIS and the surface acoustic impedance of the PAM comprises the following steps:

a plane wave is incident from a left side, propagated in an x-axis direction to a surface of the IAIS or PAM without a back cavity, and reflected; microphones 1 and 2 are configured for measuring a complex acoustic pressure of a standing wave field inside the impedance tube, a distance between microphones 1 and 2 is s, and distances between the microphones and the surface of the non-standard sized sample are $x_1$ and $x_2$, respectively; a cross spectrum $S_{12}$ and a self-spectrum $S_{11}$ between the microphones 1 and 2 are expressed as

12

$$S_{12} = sp_1 \cdot sp_2^* \quad (4) \tag{3}$$

$$S_{11} = sp_1 \cdot sp_1^* \quad (4) \tag{4}$$

wherein * represents a conjugate complex number, and $sp_1$ and $sp_2$ represent complex acoustic pressure at the microphone 1 and the microphone 2, respectively; a transfer function $H_{12}$ from microphone 1 to microphone 2 is expressed as $$H_{12}=S_{12}/S_{11} \tag{5}$$

a transfer function $H_i$ of incident wave is allowed to be expressed as $$H_i = \frac{p_{2i}}{p_{1i}} = e^{-jk_0(x_1-x_2)} = e^{-jk_0 s} \tag{6}$$

wherein $k_0=2\pi f/c$ being a wave number; c is an acoustic velocity; f is a frequency; and j is an imaginary unit; similarly, a transfer function $H_r$ of reflected wave is allowed to be expressed as $$H_r = \frac{p_{2r}}{p_{1r}} = e^{jk_0(x_1-x_2)} = e^{jk_0 s} \tag{7}$$

a complex reflection factor r on the surface of the IAIS or PAM is expressed as $$r = \frac{H_{12} - H_i}{H_r - H_{12}} e^{2jk_0 x_1} \tag{8}$$

wherein the surface acoustic impedance Z of the IAIS or PAM is expressed as $$Z = \frac{1+r}{1-r}. \tag{9}$$

12. The device according to claim 11, wherein in the method, after the surface acoustic impedances of the IAIS and the PAM are obtained, the surface acoustic impedance $Z_{NSS}$ of the non-standard sized sample is calculated by formula (2), $$Z_{NSS} = \frac{r_{NSS}}{\dfrac{1}{Z_{IAIS}} - \sum_{i=1}^{n} \dfrac{r_{PAM,i}}{Z_{PAM,i}}} \tag{10}$$

the normal incidence sound absorption coefficient $\alpha_{NSS}$ of the non-standard sized sample is expressed as $$\alpha_{NSS} = \frac{4Re(Z_{NSS})}{[1 + Re(Z_{NSS})]^2 + [Imag(Z_{NSS})]^2} \tag{11}$$

wherein Re($Z_{NSS}$) is a real part of the acoustic impedance of the non-standard sized sample; and Imag($Z_{NSS}$) is an imaginary part of the acoustic impedance of the non-standard sized sample.

13. A storage medium, comprising computer executable instructions, wherein the computer executable instructions, when executed by a computer processor, are configured for performing the method according to claim 1.

14. The storage medium according to claim 13, wherein in the method, normal incidence sound absorption coefficients of porous materials of non-standard sized samples and resonant acoustic absorption structures with any cross-sectional size and shape is allowed to be measured.

\* \* \* \* \*